United States Patent [19]

Engel

[11] 3,939,363
[45] Feb. 17, 1976

[54] CIRCUITRY WITH ZENER DIODE VOLTAGE SURGE SUPPRESSOR CONNECTED TO SERVE AS HALF WAVE RECTIFIER

[75] Inventor: Joseph C. Engel, Monroeville, Pa.

[73] Assignee: Westinghouse Electric Corporation, Pittsburgh, Pa.

[22] Filed: Feb. 25, 1974

[21] Appl. No.: 445,524

[52] U.S. Cl. ......... 307/202 R; 307/318; 330/207 P; 317/16; 317/31; 317/50
[51] Int. Cl.² ......................................... H07H 7/20
[58] Field of Search................. 307/202, 318, 283; 330/207 P; 324/110; 317/16, 9, 50, 61.5, 31; 321/12

[56] References Cited
UNITED STATES PATENTS

| | | | |
|---|---|---|---|
| 3,047,746 | 7/1962 | Berkery | 307/93 |
| 3,171,074 | 2/1965 | Momberg et al. | 307/318 X |
| 3,305,750 | 2/1967 | Schneider | 307/318 X |
| 3,365,617 | 1/1968 | Flanagan | 307/318 |
| 3,786,364 | 1/1974 | Wheatley, Jr. | 330/207 P |

Primary Examiner—Stanley D. Miller, Jr.
Assistant Examiner—B. P. Davis
Attorney, Agent, or Firm—G. H. Telfer

[57] ABSTRACT

A pair of Zener diodes having like electrodes interconnected for voltage suppressor functions also has a connection to their common point for obtaining half wave rectified voltage from an alternating source.

5 Claims, 3 Drawing Figures

CIRCUITRY WITH ZENER DIODE VOLTAGE SURGE SUPPRESSOR CONNECTED TO SERVE AS HALF WAVE RECTIFIER

BACKGROUND OF THE INVENTION

This invention relates to electrical circuitry for surge suppression and rectification.

It is well known to employ two Zener diodes with one pair of common electrodes connected together as a voltage surge suppressor for protecting some circuitry from excessive AC voltages. As so connected, the Zener diodes are said to be in series opposition. When connected across the input terminals of a circuit portion to be protected they act, together, as practically an open circuit unless and until the AC voltage exceeds the Zener breakdown voltage of the diodes.

One instance in which Zener diode voltage suppressors are used in the foregoing manner is where a component, such as thyristor, must be protected from large forward and reverse transients in order to avoid damage to it. For example, this is the case in ground fault interrupters having a sense amplifier and trip circuit energized by the line voltage and employing a thyristor in a manner such as that described in copending application Ser. No. 302,949, filed Nov. 1, 1972 by the present inventor and others now U.S. Pat. No. 3,852,642 issued Dec. 3, 1974. A straightforward application of a Zener diode voltage suppressor for the protection of a thyristor in such a circuit requires the addition of two components, namely the two Zener diodes, with the disadvantages of their cost and inherent size. It is the case in ground fault interrupters, as it is in many other types of circuits, that the number, cost, and size of components must be minimized to achieve a commercially successful product yet without detracting from the functioning of the circuit.

SUMMARY OF THE INVENTION

While it is apparent that the invention has some wider applicability, a GFI sense amplifier and trip circuit of the general type described in the referred to application Ser. No. 302,949 is an example of an instance in which the application of the invention is advantageous in order to minimize the number of components and their cost and size.

In accordance with this invention a pair of Zener diodes or similar devices, having like electrodes interconnected for voltage suppressor functions also have a connection to their common point for obtaining half wave rectified voltage from an alternating source.

In circuits as particularly described in Ser. No. 302,949 the operating voltage is half wave rectified from the AC line voltage that is inherently subject to transients that could result in damage to the thyristor in the circuit. Stated differently, effective transient suppression means a lower cost thyristor can be used. However, in accordance with this invention, the functions of providing a half wave rectified supply and of suppressing voltage surges to which the thyristor would otherwise be exposed are achieved by only two Zener diodes connected in series opposition. Instead of having the pair of Zener diodes in a circuit branch that is connected in parallel across the thyristor, that is a "two terminal" combination of elements, a "three terminal" combination of elements is used. In the three terminal combination common electrodes of the diodes, either anodes or cathodes, referred to as first and second terminals, are used for connection to the source of line voltage. A third terminal is provided to the common point interconnecting the other two diode electrodes, and this third terminal as well as one of the first-mentioned terminals are used for connection across the thyristor or other circuit portion to be protected. Consequently, the desired voltage suppressor functions are attained with an increase of only one element in the circuit.

Zener diodes are referred to herein as they are contemplated for use in embodiments of the invention, however it is to be understood other elements having the characteristics of providing rectification and voltage dependent conduction in the reverse direction, such as a selenium rectifier, maay also be employed.

DESCRIPTION OF THE PREFERRED EMBODIMENTS

Figure 1:
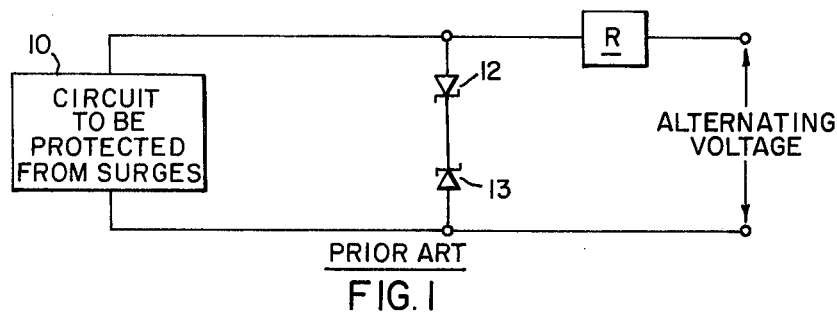
FIG. 1 is a general schematic diagram of a voltage suppressor arrangement in accordance with the prior art.

Referring to FIG. 1, a general arrangement in accordance with the prior art is illustrated. An alternating voltage is applied to a circuit 10 through some impedance R that limits current. The circuit 10 may include components for modifying the supply voltage such as by producing a half wave rectified voltage from a full-wave alternating supply. For protection of the circuit 10 from surges, a pair of Zener diodes 12 and 13, or equivalent devices that may be referred to as means for rectifying and having a voltage dependent reverse blocking characteristic, are connected across the circuit to be protected. The voltage suppressor of diodes 12 and 13 is therefore additional to any components required in the circuit 10.

Figure 2:
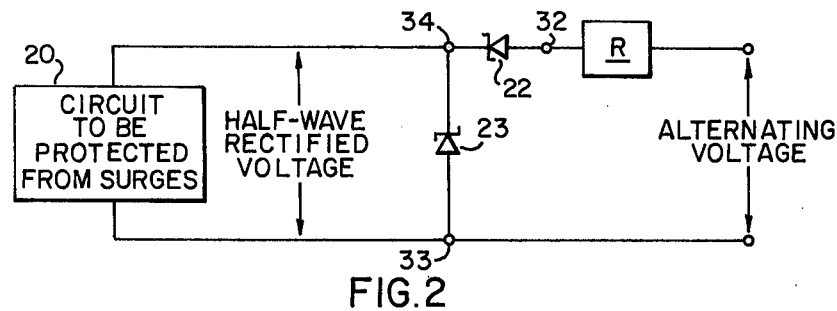
FIG. 2 is a general schematic diagram of a voltage suppressor arrangement in accordance with this invention.

Referring to FIG. 2, a general arrangement in accordance with this invention is shown in which the pair of Zener diodes 22 and 23 are connected in series opposition but with three available terminals 32, 33, and 34 of which two (32 and 33) are connected to the alternating voltage source and the second terminal 33 as well as a third terminal 34 at the common point between the diodes are connected to a circuit 20 to be protected from surges. The first diode 22 is therefore conductive of half waves of a polarity in its forward direction at all times during normal operation and blocks half waves of opposite polarity. Yet both diodes together provide surge suppressing functions as in the combination of FIG. 1.

Figure 3:
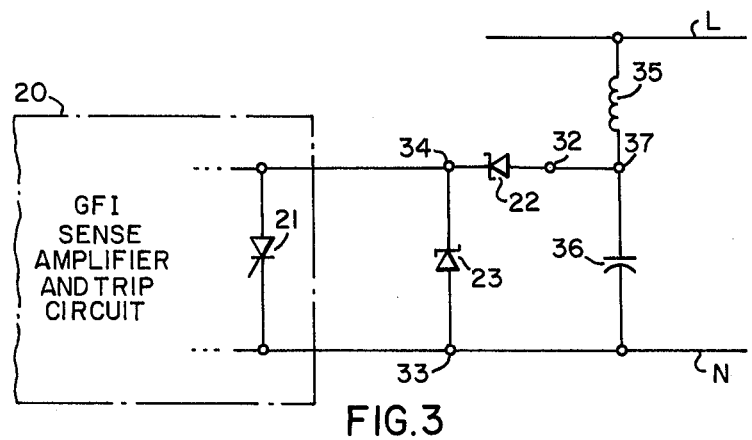
FIG. 3 is a more particular example of the present invention.

In the circuit of Ser. No. 302,949, which should be referred to for fuller description of the context in which application of the present invention is particularly desirable, a diode current rectifier is employed because it is intended that the sense amplifier be operated with an unfiltered half wave rectified voltage, apart from any question of surge suppression. Referring to FIG. 3 there is shown an embodiment of the present invention for protecting against surges and supplying half wave rectified voltage to a circuit such as that of Ser. No. 302,949. Here between a hot line conductor L and a neutral conductor N, such as of a conventional electrical supply system in household or other use, there is a circuit branch that includes a solenoid coil 35, such as for a circuit breaker to open the line conductor L upon certain conditions, and a capacitor 36 that is provided for suppressing high frequency transients. Coil 35 also acts as the current limiting impedance R of FIG. 2 that permits use of a Zener diode voltage suppressor. A sense amplifier and trip circuit 20 or other circuit portion to be protected is connected to the supply at a point 37 between the solenoid coil and the capacitor and at the neutral conductor. The thyristor 21 of the sense amplifier and trip circuit is illustrated to show it is connected to pass positive half cycles as they appear at point 37.

A Zener diode three terminal arrangement in accordance with this invention is connected as shown with the first Zener diode 22 in a forward direction, the same as that of the thyristor, and a second Zener diode 23 connected in opposition to the first across the thyristor, thus producing the three terminals 32, 33 and 34 of which first and second terminals 32 and 33 at the diode anodes are connected across the capacitor 36 and a third terminal 34 is at the common cathode connection of the diodes to one side of the thyristor while the second terminal 33 is connected to the other side of the thyristor.

In this way, the cost and size of adding two Zener diodes to the circuit is reduced by eliminating the diode current rectifier that would otherwise be necessarily present to supply half wave rectified voltage to the circuit. The Zener diodes cooperate with each other and the rest of the circuit to provide a half wave voltage source at one terminal 34.

It is possible in the arrangement of FIG. 3 to substitute for the first Zener diode 22 a high voltage conventional diode rectifier if preferred. The rating of such a conventional diode would probably be of the order of 1,000 volts. In circuits as described for use in conjunction with that of Ser. No. 302,949 it is suitable to employ for each of the diodes 22 and 23 200 volt breakdown Zener diodes and a capacitor 36 having a value of 0.005 microfarads; coil 35 has a minimum resistive impedance of about 50 ohms; all of which are suitable for protection of a thyristor having a breakdown voltage in excess of that of the Zeners.

The alternative using a conventional diode in place of Zener diode 22 requires the presence of high frequency bypass capacitor 36. The capacitor 36, while preferred, is not essential in the arrangement in which both elements 22 and 23 are Zener diodes.

What is claimed is:

1. Electrical apparatus comprising:
a first circuit portion requiring a half wave rectified voltage source and including an element to be protected from surge voltages beyond a predetermined value;
a three terminal diode arrangement interconnected with the first circuit portion, the diode arrangement including a pair of diodes connected in series opposition and having first and second terminals to common electrodes of said diodes that are not connected to each other and a third terminal at the other pair of common diode electrodes that are connected to each other with the first and second terminals available for connection to a full wave alternating voltage source and the second and third terminals connected across the element to be protected, at least said diode between said second and third terminals having rectification and voltage dependent conduction characteristics;
said first circuit portion being a sense amplifier and trip circuit of a ground fault interrupter and said first and third terminals of said diode arrangement being connected to conductors of a full wave alternating voltage supply including a neutral conductor connected to the second diode terminal and a hot line conductor connected through a solenoid trip coil to the first diode terminal.

2. The combination of claim 1 wherein: the element to be protected is a thyristor connected in its forward direction from the third to the second terminals of the diode combination, a first of the pair of diodes is connected in its forward direction between the first and third terminals of the combination and the second diode is connected in its forward direction from the second to the third terminals of the combination.

3. The subject matter of claim 1 wherein: both of the pair of diodes are Zener diodes.

4. The subject matter of claim 1 wherein: a bypass capacitor is connected across the first and second diode terminals.

5. The subject matter of claim 1 wherein: at least said diode between said second and third terminals is a Zener diode.

* * * * *